US007606907B1

(12) United States Patent
Aalto et al.

(10) Patent No.: US 7,606,907 B1
(45) Date of Patent: Oct. 20, 2009

(54) INTERNET/INTRANET ACCESS MECHANISM

(75) Inventors: Mika Aalto, Ratingen (DE); Marja Lakso, Espoo (FI); Kai Nyman, Espoo (FI)

(73) Assignee: Wi-Lan Inc., Ottawa, ON (CA)

( * ) Notice: Subject to any disclaimer, the term of this patent is extended or adjusted under 35 U.S.C. 154(b) by 0 days.

(21) Appl. No.: 09/762,226

(22) PCT Filed: Aug. 5, 1999

(86) PCT No.: PCT/FI99/00652

§ 371 (c)(1),
(2), (4) Date: Mar. 7, 2001

(87) PCT Pub. No.: WO00/08890

PCT Pub. Date: Feb. 17, 2000

(30) Foreign Application Priority Data

Aug. 6, 1998 (FI) .................. 981708

(51) Int. Cl.
G06F 15/16 (2006.01)
(52) U.S. Cl. ........................ 709/227; 709/237
(58) Field of Classification Search .......... 709/237
See application file for complete search history.

(56) References Cited

U.S. PATENT DOCUMENTS 5,915,008 A * 6/1999 Dulman ................. 379/221.08
5,940,598 A * 8/1999 Strauss et al. ............. 709/249
6,061,650 A * 5/2000 Malkin et al. ............. 704/228
6,490,273 B1 * 12/2002 DeNap et al. ............. 370/352
6,597,689 B1 * 7/2003 Chiu et al. ................ 370/354

FOREIGN PATENT DOCUMENTS

| EP | 0 700 231 | 3/1996 |
| EP | 0 873 038 | 10/1998 |
| WO | WO 96/38962 | 12/1996 |
| WO | WO 98/36608 | 8/1998 |

OTHER PUBLICATIONS

Huang, Nen-Fu et al., "Virtual LAN Internetworking over ATM Networks for Mobile Stations," Apr. 1997, IEEE, vol. 3, pp. 1397-1404.*
Jaeger, Rudolf, "Performance Management Issues of Currently Operated ATM Enterprise Networks," Jan. 1996, IEEE, vol. 34, Issue 1, pp. 70-76.*
Ericsson Review, vol. 1b, 1998, Patrik Nilsson et al, "ANx-High-speed Internet access", see whole document, pp. 24-31.
Alcatel Telecommunications Review, vol. 4, 1997, W. Verbiest, "High Speed Internet Access Over ADSL: Making It Happen", see whole document. pp. 280-286.

* cited by examiner

Primary Examiner—Patrice Winder
Assistant Examiner—Azizul Choudhury

(57) ABSTRACT

A method connects one of several customer premises equipment (CPE) via an ATM network to one of several service providers (SP). Each CPE is connected to the ATM network via a corresponding network termination point (NT). There is an access server function (ASF), having a permanent virtual connection (PVC) to each NT and a connection to each SP. A tunneling protocol is established on the permanent virtual connection between each NT and the ASF. The tunneling protocol is able to support an integrated signaling protocol. The CPE or its user select selects an appropriate SP by using the integrated signaling protocol. Routing from the CPE to the selected SP is performed by the ASF. The ASF connects the CPE to the selected SP using the integrated signaling protocol.

18 Claims, 1 Drawing Sheet

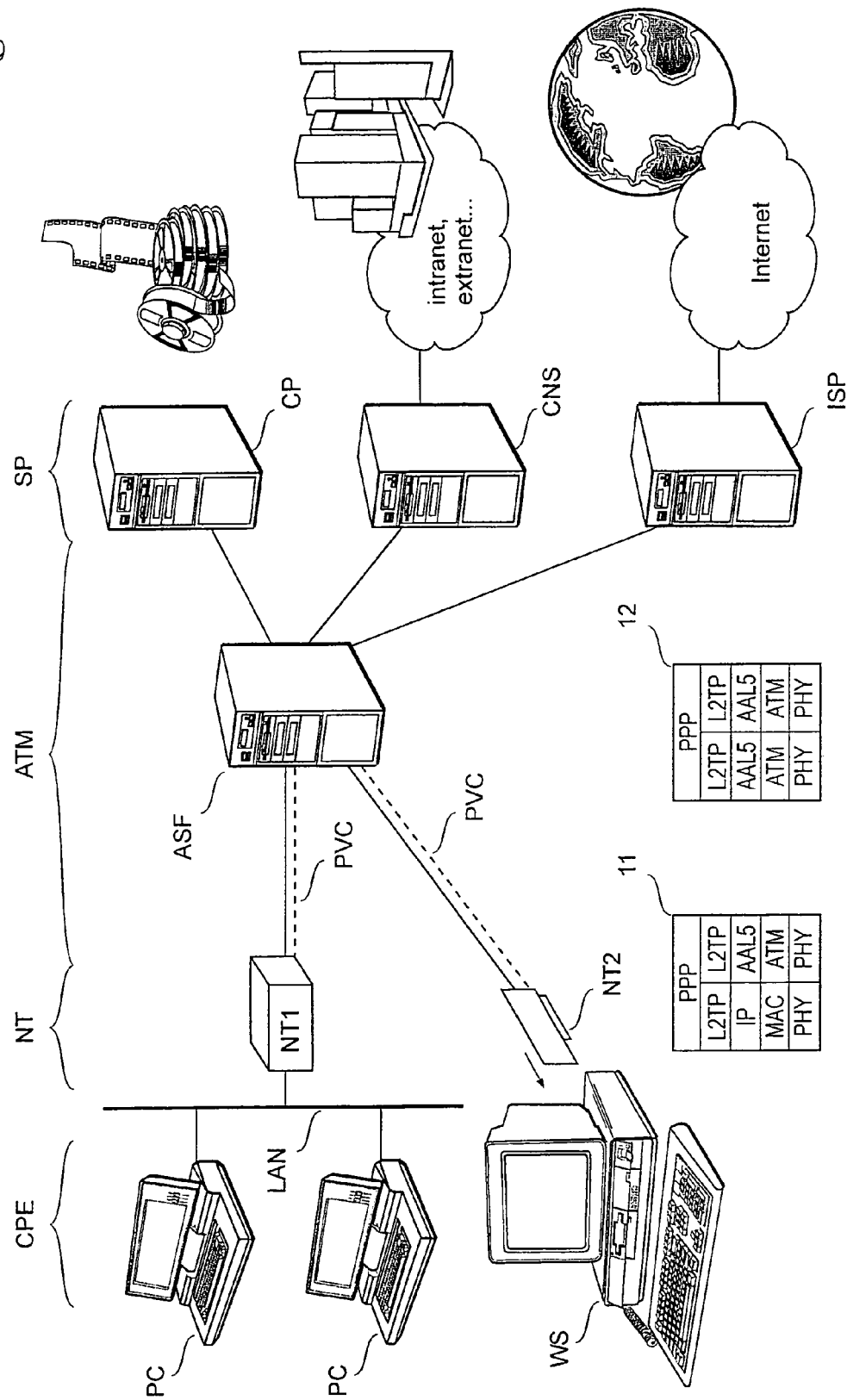

INTERNET/INTRANET ACCESS MECHANISM

This application is the national phase of international application PCT/FI99/00652 filed Aug. 5, 1999 which designated the U.S.

BACKGROUND OF THE INVENTION

The invention relates to a mechanism for accessing the Internet via an ATM (Asynchronous Transfer Mode) network. Within the context of this application, 'Internet' should be interpreted broadly to cover any large-area networks using Internet Protocols (IP). Especially it is the applicant's intention to include future developments, such as Internet 2 or NGI ('Next generation Internet'), and corporate networks, commonly referred to as intranets or extranets.

A person designing an Internet access mechanism faces several issues, such as interoperability, security, billing, economic use of IP addresses, and how to make the best use of installed equipment, etc.

From references [1, Kwok et al.] and [2, Nilsson et al.] are known Internet access mechanisms for connecting each of several customer premises equipment (abbreviated "CPE") via an ATM network to one of several service providers (SP). The concept of service provider comprises Internet service provides (ISP), content providers (CP, for video-on-demand, etc.), and corporate network servers (CNS, for telecommuting, etc.)

Referring to FIG. 1, CPEs are connected to the ATM network at network termination points (NT). A typical NT, such as NT1 in FIG. 1, is a network gateway having a network interface for the customer's local area network, LAN, and another interface towards the ATM network. Alternatively, a personal computer PC or a workstation WS can be connected directly (without a LAN) to the ATM network by means of an ATM/ADSL adapter card (shown as NT2), which in this case is the NT. In both cases, there is a well-defined NT for each CPE (although one NT may serve several CPEs). According to both cited references, the network comprises an access server function, or ASF, having a connection to each NT and each SP such that each NT has a permanent connection or a permanent virtual connection to the ASF. The wording 'access server function' implies that the ASF can be a dedicated network element or it can be integrated into or co-located with another network element, such as an ATM switch. In the cited references, the ASF has been referred to as an 'access node'/'DSLAM' (digital subscriber line access multiplexer) or an 'edge router'. It should be noted that the difference between 'permanent connection' and 'permanent virtual connection' has become rather blurred and later in this application, only 'permanent virtual connection' (PVC) will be used.

A problem of the known Internet access mechanisms is that they do not give a satisfactory answer to following problem: How can a specific end-user be connected to the desired service provider with a minimal number of permanent virtual circuits (PVCs) with a possibility of end-user authentication taking place only at the ends of the PVCs (not necessarily at the ASF)?

DISCLOSURE OF THE INVENTION

An object of the invention is to solve or at least minimise the problem associated with the prior art access mechanisms. The object is achieved with a method and equipment which are characterized by what is disclosed in the attached independent claims. Preferred embodiments of the invention are disclosed in the attached dependent claims.

The invention is based on establishing a tunnelling protocol on the permanent virtual connection between each CPE or NT and the ASF, wherein the tunnelling protocol is able to support an integrated signalling protocol. Selecting an appropriate SP is based on the integrated signalling protocol. Routing to the selected SP is performed by the ASF. Finally, the ASF connects the CPE or NT to the selected SP using the integrated signalling protocol.

Within the context of this application, 'tunnelling protocol' refers to a protocol which allows creating and maintaining virtual private sessions via various network media such as IP, ATM, Frame Relay, etc. Correspondingly, 'integrated signalling protocol' (i.e. a signalling protocol integrated into the tunnelling protocol) refers to a control protocol which is used for creating, maintaining and releasing these sessions.

Implementation of the invention, however, raises two new issues: the ATM network must provide non-ATM functions in the ASF, and, unless properly dimensioned, the ASF can be a performance bottleneck. Such non-ATM functions performed by the ASF include functions above the ATM layer for the user connections, namely SAR/AAL5, the entire tunnelling protocol and selecting the SP by L2 signalling. These functions require appropriate administration. After a careful study of the pros and cons of the invention, it will be observed that there are situations where the advantages of the invention justify the added complexity of the ASF.

According to a preferred embodiment of the invention, one permanent virtual connection PVC is provided from the ASF to each SP. Alternatively, there is provided a pool of permanent virtual connections from the ASF to each SP. One PVC is allocated to each CPE from this pool. As a further operation, it is possible to establish one switched virtual connection (SVC) from the ASF to each SP, on the basis of signalling which the ASF receives from the CPE via the tunnelling protocol.

The tunnelling protocol can be established only in response to detecting appropriate user activity in a CPE. Alternatively, the tunnelling protocol can be permanent and the integrated signalling is initiated and the user is authenticated only in response to detecting appropriate user activity in the CPE. According to a further preferred embodiment, the user is authenticated twice, first by the ASF using the tunnelling protocol, and then by the SP.

BRIEF DESCRIPTION OF THE DRAWINGS

The invention will be described in more detail by means of preferred embodiments with reference to the appended drawing in which:

FIG. 1 is a block diagram illustrating the Internet/intranet access mechanism according to the invention.

DETAILED DESCRIPTION OF THE INVENTION

FIG. 1 a is block diagram comprising several customer premises equipment CPE, connected via network termination points NT to an access server function ASF according to the invention. The ASF can be a dedicated network element, or it can be integrated into or co-located with another network element, such as an ATM switch (which is known to a skilled person and not shown separately).

The ASF provides access from each CPE to several service providers SP, such as Internet service providers ISP, content providers CP and corporate networks CN. The invention requires no changes to the construction or operation of the SP equipment. Instead, the invention can be implemented in the ASF and the NT. There is preferably one permanent virtual connection (PVC) between each NT and the ASF.

In the embodiment shown in FIG. 1, there is one PVC from NT2 (in the workstation WS) to the ASF. Also, assuming that at least one of the personal computers PC is active, there is also a PVC from NT1 to the ASF. All the personal computers PC connected to the LAN share the PVC between NT1 and the ASF. According to a preferred embodiment of the invention, there is a tunnelling protocol, such as L2TP (Layer 2 Tunnelling Protocol), on the PVC from each active PC to the NT. The tunnelling protocol combines the sessions and signalling from all active PCs into a single tunnel from the NT to the ASF. The tunnelling protocol must be able to support an integrated signalling protocol. The end user (i.e. the person using the CPE or a software agent being executed in the CPE) selects an appropriate SP by using the integrated signalling protocol. Routing to the selected SP is performed by the ASF. Finally, the ASF connects the CPE or NT to the selected SP using the integrated signalling protocol.

Reference 11 points to a preferred protocol stack at the NT and reference 12 points to a preferred protocol stack at the ASF. (The workstation WS connected to NT2 without a LAN needs a simpler protocol stack; consisting only of the right half of the protocol stack 11, i.e. PPP, L2TP, AAL5, ATM, and PHY.) Having point-to-point connectivity PPP over L2TP provides end-to-end security. In other words, it is not necessary for the ASF to authenticate the user, although the ATM operator may still choose to do so, in order to charge the subscriber for the duration of the session. However, even in this case, the end-user's choice of SP is not known to the ATM operator, which is a clear benefit to the owners of the SPs.

The preferred embodiment saves a considerable amount of PVCs over the prior art access mechanisms. Let us calculate an example case of 10000 customers and 8 SPs and 20 ASFs (one ASF per 500 CPE). If all customers need access to all SPs, the prior art access mechanisms require a separate PVC for each customer/SP combination, i.e. in this example 8*10000=80000 PVCs. In comparison, the mechanism according to the invention requires a PVC only for each customer and each ASF/SP combination, i.e. 10000+8*20=10160 PVCs. (This number is not perfectly accurate since some ASF/SP connections can be switched virtual connections, SVC.)

According to an alternative embodiment of the invention, there is a separate PVC from each active PC between the NT and the ASF. In this case, implementation of the NT is easier because the tunnels from the PCs do not have to be combined (instead, all tunnels pass from the PCs, over the LAN, through the NT to the ASF).

The ATM operator's billing can be based on the time there is a PVC between the customer and the ASF. The invention simplifies this kind of billing because there is only one PVC from each customer. Also, when the customer changes the SP, a new PVC configuration is not needed.

Configuring and managing the NT device according to the invention, like the device itself, is rather simple. Only its LAN interface and its ATM interface require configuration: an IP address, a subnet mask and an ATM PVC. The latter can be received automatically, using a technique known as ILMI (Interim Local Management Interface) as defined by ATM Forum UNI (User to Network Interface) 3.1. ILMI supports bidirectional exchange of management information between UNI management entities related to the ATM layer and physical layer parameters. Correspondingly, the LAN interface can be configured automatically by a process known as DHCP (Dynamic, Host Configuration Protocol), as defined by the Internet Software Consortium.

The description only illustrates preferred embodiments of the invention. The invention is not, however, limited to these examples, but it may vary within the scope of the appended claims.

REFERENCES

1. Kwok, Timothy et al: *An Interoperable End-to-End Broadband Service Architecture over ASDL Systems*, version 1.0, 3 Jun. 1997, available at address http://www.3com.com/xdsl/microwt.html at the priority date of this application.
2. Nilsson, Patrik et al: *Anx—High-speed Internet Access*, available at address http://www.ericsson.com/Review/er1b_98/art4/art4.html at the priority date of this application. The www address implies that reference 2 was printed in Ericsson Review magazine.

Both cited references are incorporated herein by reference.

The invention claimed is:

1. A method for creating, maintaining, and releasing sessions between a plurality of customer premises equipment (CPE) and service providers via an Asynchronous Transfer Mode (ATM) access node, the method comprising:
   connecting one or more CPEs to the ATM access node via a network termination (NT) point;
   establishing a permanent virtual connection between the ATM access node and the NT point;
   establishing a tunneling protocol integrated with a signaling protocol over the permanent virtual connection between the ATM access node and the NT point;
   forming a virtual connection between the ATM access node and a service provider of choice on receipt of a request for a new session from the customer premise equipment indicating the service provider of choice, wherein only one virtual connection is formed between the ATM access node and each service provider; and
   at the ATM access node, performing routing between the customer premises equipment and the service provider using routing information provided by the signaling protocol.

2. The method of claim 1, wherein the ATM node comprises an access server function.

3. The method of claim 2, wherein the access server function is provided on a dedicated network element.

4. The method of claim 2, wherein the access server function is integrated into or co-located with an ATM switch.

5. The method of claim 2, wherein the access server function comprises a Digital Subscriber Line Access Multiplexer (DSLAM).

6. The method of claim 1, wherein the virtual connection comprises a permanent virtual connection.

7. The method of claim 1, wherein the virtual connection comprises a switched virtual connection.

8. The method of claim 1, wherein the service provider is an Internet service provider (ISP).

9. The method of claim 1, wherein the service provider is a content provider.

10. The method of claim 1, wherein the service provider is a corporate network server.

11. The method of claim 1, wherein one or more communication sessions are established via the respective permanent virtual connection formed between the ATM node and the respective network termination point.

12. The method of claim 1, further comprising:
   provisioning a pool of permanent virtual connections between the ATM node and the service provider; and selecting a permanent virtual connection from the pool of permanent virtual connections to be used for a plurality of the consumer premises equipment, the selected permanent virtual connection being used by the routing step to connect communication sessions to the service provider.

13. The method of claim 1, wherein the tunneling protocol comprises the Layer 2 Tunneling Protocol (L2TP).

14. The method of claim 1, further comprising:

receiving at the ATM node a selection of the service provider from a customer premises equipment via the integrating signaling protocol.

15. The method of claim 1, further comprising: selecting the service provider by signaling from the ATM node.

16. The method of claim 1, wherein the tunneling protocol combines the sessions and signaling from all active CPEs connected to the NT point into a single tunnel from the NT point to the ATM access node.

17. The method of claim 1, wherein the NT point comprises a LAN interface configured automatically using a Dynamic Host Configuration Protocol (DHCP).

18. The method of claim 1, wherein the NT point comprises an ATM interface configured using a Interim Local Management Interface (ILMI) protocol.

* * * * *